July 17, 1923.

H. HROBSKY

MERRY-GO-ROUND

Filed Jan. 27, 1922

Inventor
Hobert Hrobsky
By Young & Young
Attorneys

July 17, 1923.
H. HROBSKY
MERRY-GO-ROUND
Filed Jan. 27, 1922
1,461,881
2 Sheets-Sheet 2
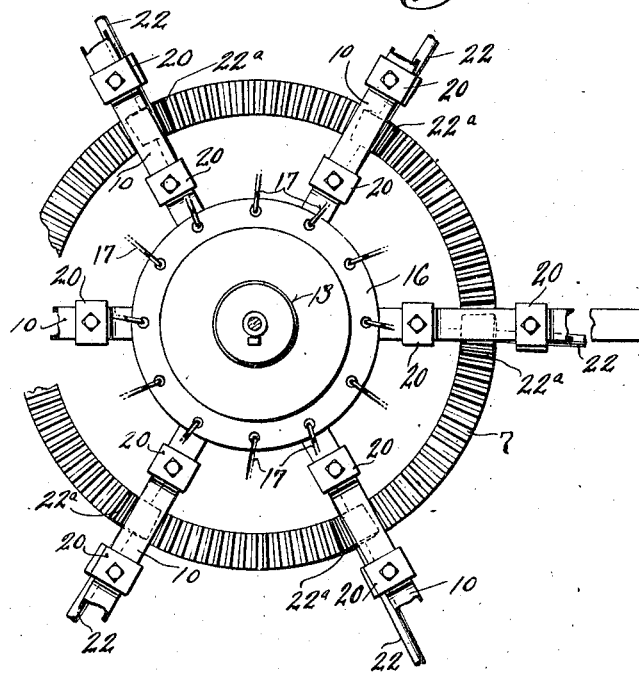
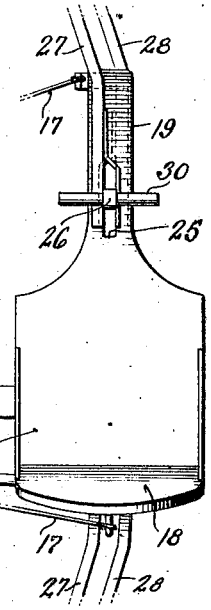
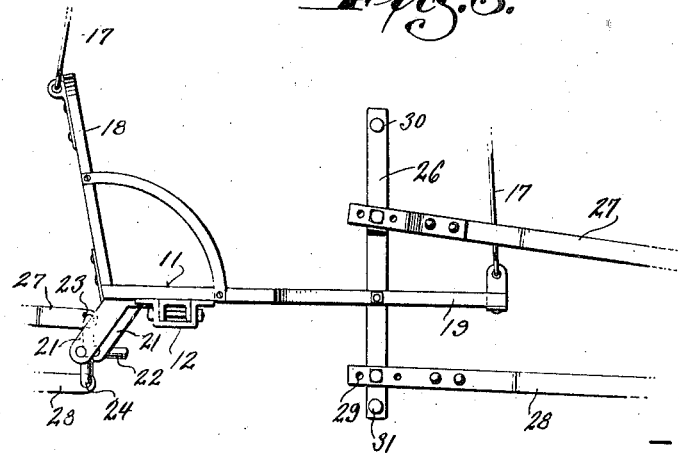
Inventor
Hobert Hrobsky
By Young & Young
Attorneys Patented July 17, 1923.

1,461,881

UNITED STATES PATENT OFFICE.

HOBERT HROBSKY, OF WATERTOWN, WISCONSIN, ASSIGNOR OF ONE-HALF TO WILLIAM G. MILLER, OF WATERTOWN, WISCONSIN.

MERRY-GO-ROUND.

Application filed January 27, 1922. Serial No. 532,267.

*To all whom it may concern:*

Be it known that I, HOBERT HROBSKY, a citizen of the United States, and resident of Watertown, in the county of Jefferson and State of Wisconsin, have invented certain new and useful Improvements in Merry-Go-Rounds; and I do hereby declare that the following is a full, clear, and exact description thereof.

My invention reates to merry-go-rounds of the general type in which the motive power for revolving the same is furnished by the persons riding thereon.

A general object of the invention includes the provision of a structure which is so supported and balanced that the friction and consequent power required to operate the merry-go-round is reduced to the least possible amount.

The invention consists further in certain structural details, which will be hereinafter explained in connection with the accompanying drawings and subsequently claimed.

In the drawings:—

Figure 2 represents a plan view of the same, and

Figure 3 is a detail view showing the connections by means of which the power is transmitted.

Figure 1:
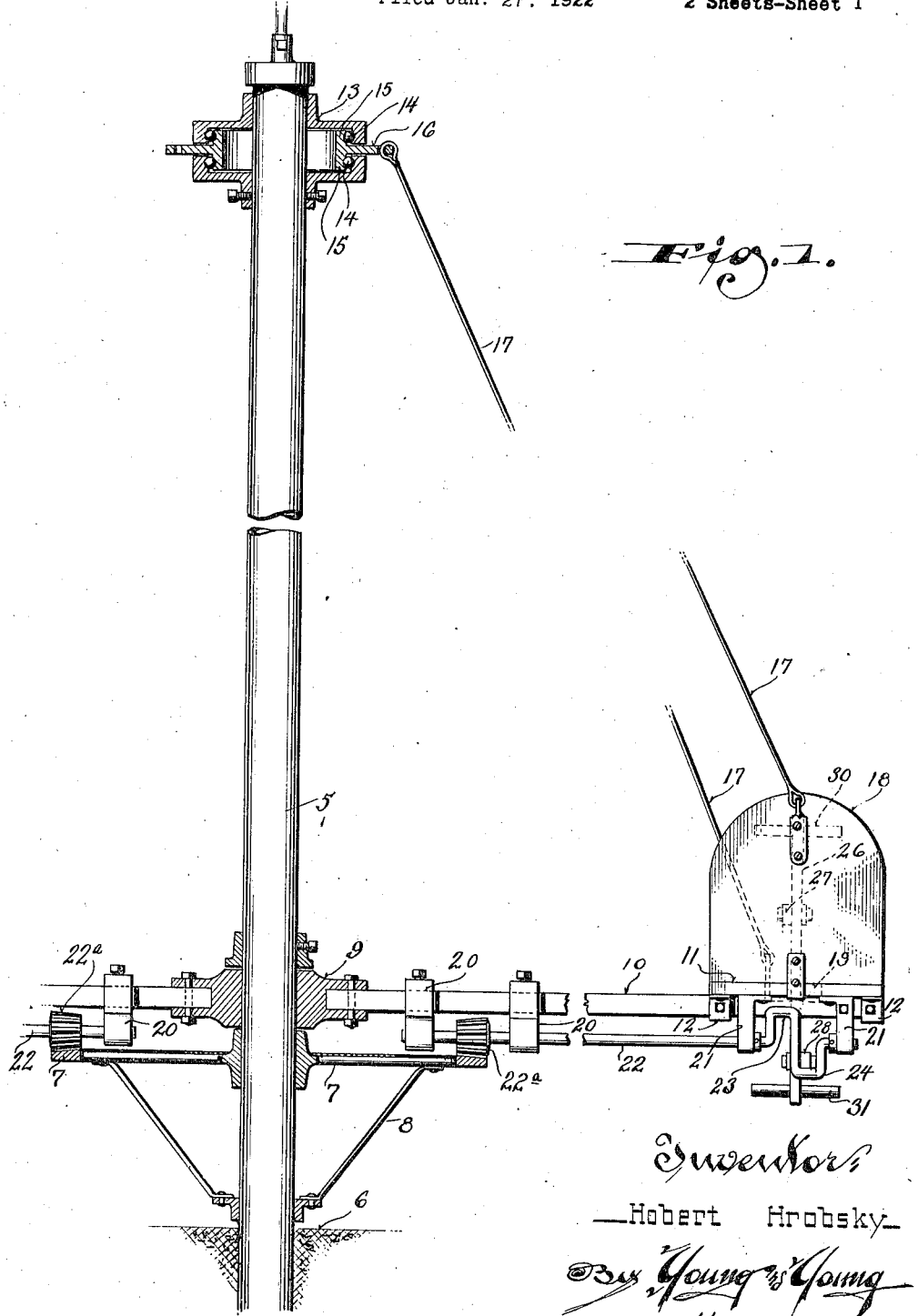
Figure 1 represents a vertical, sectional view of a portion of the merry-go-round.

The device, of which my invention forms a part, comprises a vertical, central post 5, which is preferably embedded in a base 6 of concrete or the like. Secured on this post near its lower end is a master gear 7, which is securely maintained in horizontal position by suitable braces 8. Journalled on the post above the master gear is a spider 9 having radially projecting arms 10, each of which carries at its outer end a seat 11 which is secured to the arm by a suitable bracket 12.

A journal box 13 is secured to the post 5 near its upper end and is provided with ball bearings 14 in which is journalled a hub 15. This hub is provided with an annular flange 16 which projects outwardly of the journal box and to which are secured the upper ends of a plurality of stay rods or cables 17 and the lower ends of these stay rods are connected with the seats 11 to aid in supporting the same, thus relieving the strain on the arms 10. Certain of the rods 17 are secured to the backs 18 of the seats and the remaining rods are secured to the tongues 19, which project forwardly from the seats and which are straddled by the person occupying the same.

Depending from each of the arms 10 are a plurality of journal bearings 20 and alined therewith are a plurality of journal bearings 21 which are secured to the bottom of the seat carried by the arm. A shaft 22 is journalled in the bearings 20 and 21 and carries at one end a pinion 22$^a$ which is in mesh with the master gear 7. The shaft 22 is provided with a pair of cranks 23 and 24 by which it is driven.

The tongue 19 of each seat is provided with a slot 25 within which is pivotally mounted a substantially vertical walking beam 26. Connecting rods 27 and 28 are adjustably connected by means of the holes 29 to the walking beam on opposite sides of the pivot. The forward ends of the connecting rods are journalled to the cranks 23 and 24, respectively, which are located underneath the next seat in front of the one to which the walking beam is pivoted. The walking beam is provided at its upper and lower ends with the cross heads 30 and 31, respectively, which may be engaged by the hands and feet of the person occupying the seat.

It will be understood that each seat may be provided with a walking beam which may be rocked by the occupant of the seat to rotate the crank shaft 22 through the medium of the connecting rods 27 and 28, thus causing the entire frame and seats supported thereby to revolve about the center post 5.

It will be seen from the foregoing description that the construction which I have devised is very simple and may be readily assembled. It is, also, very well balanced and supported in a manner which will insure easy operation.

It will, also, be understood that while I have shown and described one specific embodiment of the invention, various modifications may be made in the stuctural details thereof within the scope of what is claimed.

I claim:—

1. In a device of the character described, a center post having a master gear secured to the lower portion thereof, a frame revolubly mounted on said post, seats carried by the frame, a crank shaft located adjacent each seat and journalled in the frame and operatively connected with the master gear, each shaft having two cranks, a walking beam in front of each seat, and a pair of connecting rods connecting opposite ends of the walking beam to the cranks of the crank shaft associated with the next succeeding seat, said walking beam being provided with means engageable respectively by the hands and feet of a person occupying the seat.

2. In a device of the character described, a center post, a master gear secured to the lower portion thereof, a spider journalled on the post above said gear, seats carried thereby, a hub rotatably supported on the upper part of the post, stays connecting said hub with the respective seats and partially supporting the latter, a two-crank shaft journalled underneath each seat and operatively connected to the master gear, each of said seats having a forwardly projecting tongue, a walking beam intermediately pivoted to said tongue and having means for engagement by the hands and feet of a person in the seat for operating the same, and connecting rods pivotally connected at their forward ends to the respective cranks of the crank which is journalled underneath the next seat in front and adjustably connected at their rear ends to the ends of said walking beam.

In testimony that I claim the foregoing I have hereunto set my hand at Watertown, in the county of Jefferson and State of Wisconsin.

HOBERT HROBSKY.